United States Patent
Miller, Jr.

(10) Patent No.: US 7,096,134 B2
(45) Date of Patent: Aug. 22, 2006

(54) METHOD AND APPARATUS FOR MEASURING THE ROTATIONAL SPEED OF A FAN

(75) Inventor: Wayne A. Miller, Jr., Port Jefferson Station, NY (US)

(73) Assignee: Standard Microsystems Corporation, Hauppauge, NY (US)

(*) Notice: Subject to any disclaimer, the term of this patent is extended or adjusted under 35 U.S.C. 154(b) by 839 days.

(21) Appl. No.: 10/188,257

(22) Filed: Jul. 1, 2002

(65) Prior Publication Data
US 2004/0001542 A1    Jan. 1, 2004

(51) Int. Cl.
*G01R 25/00* (2006.01)

(52) U.S. Cl. ............................................. 702/79; 700/1

(58) Field of Classification Search .................. 702/79, 702/181–185, 188, 186; 318/3, 34, 129; 700/1; 709/236; 370/232, 469
See application file for complete search history.

(56) References Cited

U.S. PATENT DOCUMENTS

| | | | |
|---|---|---|---|
| 5,727,928 A | 3/1998 | Brown | |
| 5,910,743 A | 6/1999 | Baskin | |
| 5,963,887 A | 10/1999 | Giorgio | |
| 6,262,549 B1 | 7/2001 | Yang et al. | |
| 6,320,733 B1 | 11/2001 | Feldtkeller | |
| 6,339,360 B1 | 1/2002 | Santillano | |
| 2002/0185926 A1* | 12/2002 | King et al. | 310/68 B |

OTHER PUBLICATIONS

Marando et al., U.S. Appl. No. 10/459,169 entitled "Programmable PWM Stretching for Tachometer Measurement", filed on Jun. 11, 2003.

Analog Devices, Publication ADM1027, "dBCOOL™ Remote Thermal Controller and Voltage Monitor," 2003, 56 pages.

National Semiconductor Corporation, Publication LM63, "±1° C Accurate Remote Diode Digital Temperature Sensor with Integrated Fan Control," Feb. 2003, 28 pages.

Stephen Ohr, "Analog IC vendors fing 'Intel Inside' a safe bet," Sep. 12, 2002, online at http://www.eetimes.com/story/OEG20020912S0026.

* cited by examiner

*Primary Examiner*—Edward Raymond
(74) *Attorney, Agent, or Firm*—Meyertons Hood Kivlin Kowert & Goetzel, P.C.; Jeffrey C. Hood (57) ABSTRACT

A system may include a PWM (Pulse Width Modulator) configured to generate a PWM signal, a signal modifier configured to generate a modified PWM signal that includes a sampling activation signal having a different frequency than the PWM signal, fan drive circuitry configured to provide power to a fan in response to the modified PWM signal; and a sampling unit configured to sample a fan tachometer signal in response to an indication that the fan is currently powered.

31 Claims, 6 Drawing Sheets

METHOD AND APPARATUS FOR MEASURING THE ROTATIONAL SPEED OF A FAN

BACKGROUND OF THE INVENTION

1. Field of the Invention

This invention relates to fans, and more particularly, to measuring the rotational speed of a fan.

2. Description of the Related Art

Fans are often used to evacuate warm air from enclosures in which electronic systems are contained. For example, most computer systems include at least one fan to aid in system cooling. The increased airflow provided by fans aids in eliminating waste heat that may otherwise build up and adversely affect system operation.

Control of fans in a system typically involves a fan control unit executing a fan control algorithm. A fan control algorithm may determine the method for controlling one or more fans that are configured to evacuate warm air from a system enclosure. For example, the fan control algorithm may specify that a fan's speed should be increased or decreased dependent upon a detected temperature. Such control algorithms may also involve turning off a fan if the temperature is deemed cool enough to do so.

Fans often include a tachometer output that provides a signal indicative of the current speed of the fan. The tachometer signal may be used to determine whether the fan is operating properly. Often, fans used for CPU and/or computer system cooling have a three-wire interface with wires for power, ground, and the tachometer signal. Fan drive systems often use a PWM (pulse width modulator) to drive an external circuit that controls the voltage between the power and ground interfaces of the fan, which in turn controls the speed of the fan. PWMs are useful because they provide a digital control for the pulse width of a signal. The fan is turned on for the duration of the pulse and turned off between pulses. The duty cycle of the pulse train currently being provided to the fan determines the fan's speed.

One problem that results from using PWMs to drive fan circuits is that the fan is not powered for a fixed amount of time between each pulse. During this time, the tachometer circuitry associated with the fan does not receive power. As a result, the tachometer signal output by the fan may not accurately represent the current fan speed during the time between pulses. Similarly, when the fan is turned off, the tachometer signal does not indicate the speed of the fan as the fan spins down. One technique that is currently used to measure fan speed in these situations involves using an analog filtering system to measure the back EMF (Electromotive Force) inserted into the fan tachometer signal by the rotating fan. However, it is desirable to be able to accurately detect fan speed using a digital technique.

SUMMARY

A method and apparatus for detecting the speed of a fan may be implemented by modifying a PWM signal used to power the fan to include a sampling activation signal having a frequency different than the PWM signal and by sampling the fan's tachometer signal in response to the modified PWM signal. In some embodiments, a system may include a PWM (Pulse Width Modulator) configured to generate a PWM signal, a signal modifier configured to generate a modified PWM signal that includes the sampling activation signal, fan drive circuitry configured to provide power to a fan in response to the modified PWM signal; and a sampling unit configured to sample a fan tachometer signal in response to an indication that the fan is currently powered. The PWM, the signal modifier, and the sampling unit may be included in an integrated circuit. The signal modifier may include a sample signal generator configured to generate the sampling activation signal. The signal modifier may also include a mixer configured to generate the modified PWM signal by mixing the PWM signal and the sampling activation signal. In other embodiments, the signal modifier may include a fan control unit configured to provide control signals to the PWM that change the frequency of the PWM signal.

In some embodiments, a method may involve generating a PWM signal, modifying the PWM signal to create a modified PWM signal that includes a sampling activation signal having a different frequency than the PWM signal, powering a fan in response to the modified PWM signal, and sampling a fan tachometer signal in response to an indication that the fan is currently powered.

BRIEF DESCRIPTION OF THE DRAWINGS

Other aspects of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF EMBODIMENTS

Figure 1:
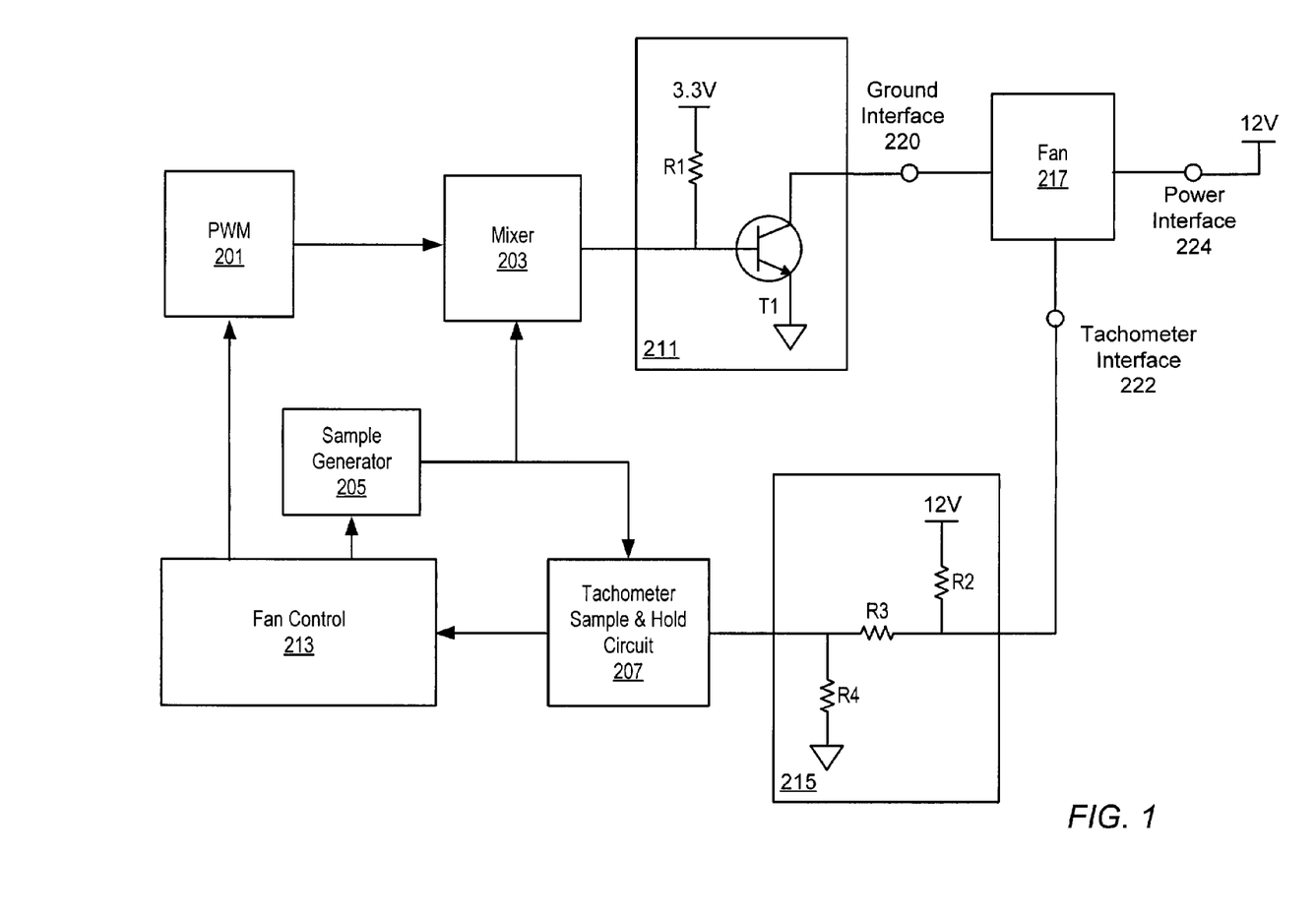
FIG. 1 is a block diagram of one embodiment of a system for detecting the speed of a fan.

FIG. 1 shows an embodiment of a system for detecting the speed of a fan. In this embodiment, a fan 217 has a three-wire interface. One wire provides a power interface 224 and another provides a ground interface 220. The third wire provides a tachometer interface 222.

A PWM (Pulse Width Modulator) 201 generates a PWM signal that powers the fan 217. The PWM 201 may generate the PWM signal in response to one or more control signal(s) from a fan control unit 213. For example, the PWM 201 may modify the duty cycle (the ratio of the time in which the PWM signal is asserted to the time in which the PWM signal is deasserted) of the PWM signal, or cease generating the PWM signal altogether, in response to one or more control signals from the fan control unit 213. Modifying the duty cycle of the PWM signal modifies the speed of the fan 217. As the duty cycle increases, the fan is powered for a greater percentage of time each cycle. Consequentially, the fan speed increases. Similarly, as the duty cycle decreases, the fan speed decreases. In one embodiment, the control signals may digitally program the pulse width of the PWM signal. The PWM 201 may include a register or memory that stores a digital value that controls the current pulse width. The PWM 201 may be configured to update this digital value in response to control signals from fan control unit 213.

The PWM signal may be input to fan drive circuitry 211 that includes an NPN transistor T1 and a pull-up resistor R1. When the PWM signal is high, transistor T1 may be turned on, connecting the ground interface 220 of the fan 217 to ground. When the PWM is low, transistor T1 may be turned off. When transistor T1 is turned off, an open circuit exists between the ground interface 220 and ground. Accordingly, in this embodiment, turning off transistor T1 by deasserting the PWM signal turns off the power to the fan 217.

When the fan 217 is powered, a tachometer signal may be output from the tachometer interface 222. When the fan is not powered, circuitry (not shown) inside the fan 217 that generates the tachometer signal may be disabled. Accordingly, the tachometer signal may be inaccurate during times in which the fan is not powered. The tachometer signal may pass through circuitry 215, which includes resistors R2, R3, and R4, and be input to fan control unit 213. In many embodiments, the tachometer signal (when valid) may include two pulses per revolution of the fan. For example, the tachometer signal may be generated as a digital pulse train in which there are two 50% duty cycle pulses for each rotation of the fan.

Fan control unit 213 may use the tachometer signal to detect the speed of the fan (e.g., by measuring the time between pulses). The speed of the fan may be used to determine how to control the fan 217. For example, the actual speed, as indicated by the tachometer signal, may be compared to an expected fan speed to determine whether the fan is operating properly. Similarly, the fan control unit 213 may determine which control signal(s) (e.g., in order to increase or decrease fan speed) to provide to the PWM based on the current speed of the fan 217.

In order to be able to detect the speed of the fan 217 when the fan 217 is not powered (e.g., when the PWM signal generated by PWM 201 is low in this embodiment), the PWM signal may be modified to include a sampling activation signal having a different frequency than the PWM signal. In one embodiment, the sampling activation signal may be a higher frequency (with respect to the PWM signal) signal generated by a sample generator 205. This sampling activation signal may be combined with the PWM signal by a mixer 203 and used to control when the fan 217 is powered (e.g., by controlling transistor T1). In one embodiment, the sample generator 205 may include a PWM configured to generate a low duty cycle, high frequency sample signal.

The sample generator 205 may be configured to generate the sampling activation signal even when the PWM is not generating a PWM signal (i.e., even when the fan has been turned off). For example, the sample generator 205 may be configured to generate the sampling activation signal for a certain time after the fan has been turned off so that the fan speed may be measured while the fan is spinning down. Similarly, the mixer 203 may be configured to continue providing the sampling activation signal to fan drive circuitry 211 even when the PWM signal is not being generated and/or driven. In some embodiments, the fan control unit 213 may be configured to provide one or more control signals to the sample generator 205 and/or the mixer 203 in order to control when these components operate.

The sampling activation signal (or, in alternative embodiments, the mixed signal output by the mixer 203) may be provided to a tachometer sample and hold circuit 207. The tachometer sample and hold circuit 207 may be configured to sample the tachometer signal (e.g., at the output of circuitry 215) in response to the sampling activation signal. For example, in the embodiment of FIG. 1, the tachometer signal is correct during a portion of each sample pulse since the fan 217 is powered in response to the sampling activation signal being asserted. Accordingly, the tachometer sample and hold circuit 207 may sample the tachometer signal during times in which the tachometer signal is known to be correct. The tachometer sample and hold circuit 207 may also hold the sampled value until the next time the tachometer signal is sampled in order to reconstruct the valid tachometer signal. The sample and hold circuit 207 may provide the reconstructed tachometer signal to the fan control unit 213, which may in turn use the reconstructed tachometer signal to control the PWM 201. Note that other means for reconstructing the tachometer signal from the sampled tachometer signal may be used in other embodiments. Note also that if the mixer's output signal is used to control the sample and hold circuit, the sample and hold circuit 207 may be configured to sample the tachometer signal more than once during certain pulses, dependent on the length of each pulse (e.g., more samples may be taken in longer pulses than in shorter pulses).

By modifying the powering PWM signal to include a sampling activation signal, the fan tachometer may be more accurately sampled during times at which the fan 217 is powered. While the illustrated embodiment modifies the PWM signal used to power the fan to include a sampling activation signal by mixing a higher frequency, lower duty cycle sample signal with the powering PWM signal, other embodiments may modify the powering signal to include a sampling activation signal in other ways. For example, in one embodiment, the fan control circuit 213 may be configured to modify the frequency of the PWM 201 so that the PWM 201 outputs a higher-frequency sampling activation signal of the same duty cycle. The higher-frequency signal output by the PWM may be provided to the sample and hold circuit 207 to control when the fan's tachometer output is sampled. The sample and hold circuit 207 may sample the tachometer signal one or more times during each pulse of the modified PWM signal and hold the sampled value until the next sample is taken. In one such embodiment, the frequency of the modified PWM signal may be selected depending on the current fan speed so that the frequency of the modified PWM signal is at least the Nyquist rate for the current tachometer signal. Thus, in such an embodiment, the frequency of the modified PWM signal may vary depending on the current speed of the fan. Also, in some embodiments, the frequency of the signal generated by the PWM 201 may be digitally programmable. For example, the PWM 201 may store a digital value that controls the frequency of the PWM signal generated by the PWM 201. This value may be updated in response to control signals from fan control unit 213.

While the embodiment described with respect to FIG. 1 shows a fan drive circuit that generates an active-high PWM signal, other embodiments may generate an active-low PWM signal. For example, if T1 is a PNP transistor, T1 may turn on when the PWM signal is deasserted. In such an embodiment, T1 may be coupled to the power interface of the fan circuit (instead of being to the ground interface as shown in FIG. 1) between the power interface and the power source. When T1 is turned on, T1 may connect the power interface of the fan circuit to the power source. In embodiments in which the PWM signal is active low, the PWM signal may be modified to include an active-low sampling activation signal.

In some embodiments, a system for detecting the speed of a fan by modifying the powering PWM signal to include a sampling activation signal and sampling the tachometer output in response to the sampling activation signal may consume less power than an analog filtering system that detects fan speed by measuring the back EMF (electromotive force) injected onto the tachometer signal as a result of fan rotation. Some embodiments of a system such as the one shown in FIG. 1 may also be more stable across process, temperature, and/or voltage variations than an analog filtering system that detects fan speed by measuring back EMF. Note that other embodiments may not include these features.

The system shown in FIG. 1 may be configured as a digital fan controller in some embodiments. For example, the pulse width and/or the frequency of the signals generated by the PWM 201 and the sample generator 205 may be digitally programmed by fan control unit 213. In many embodiments, at least a portion of the system shown in FIG. 1 (with the exception of fan 217) may be implemented as an integrated circuit. For example, in one embodiment, the PWM 201, mixer 203, sample generator 205, fan control unit 213, and sample and hold circuit 207 may be implemented as an integrated circuit.

Figure 2:
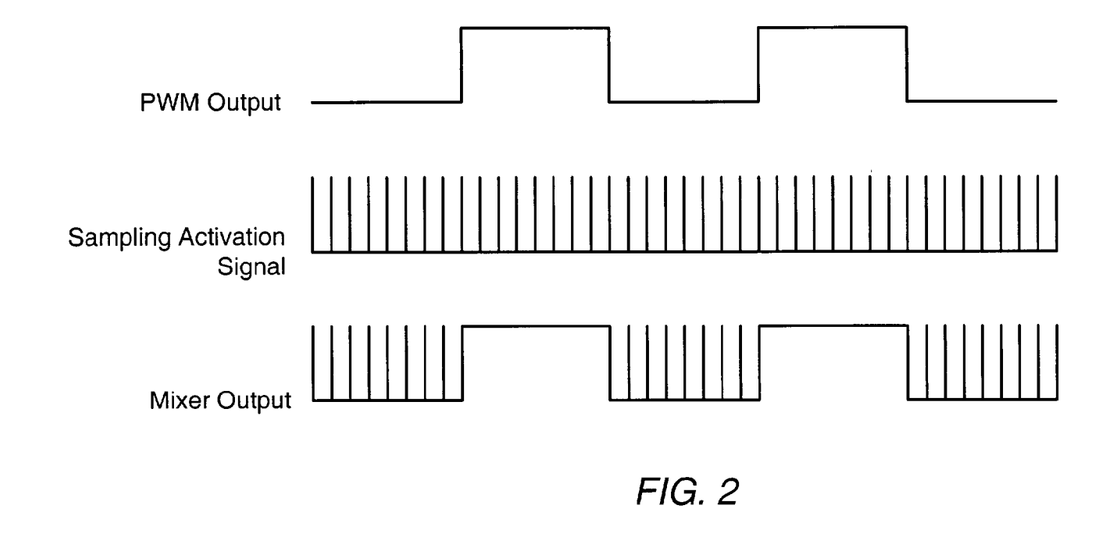
FIG. 2 shows exemplary signals that may be generated in the embodiment of a system to detect the speed of a fan.

FIG. 2 shows timing diagrams of exemplary signals that may be generated in an embodiment of a system for detecting the speed of a fan. In this example, a PWM output signal with a 50% duty cycle is generated by a PWM (note that PWM signals with duty cycles other than 50% may also be generated). A sampling activation signal with a higher frequency and lower duty cycle than the PWM signal may be generated by a sample generator. A mixer may combine the two signals to create a mixer output signal. As shown in FIG. 2, the sampling activation signal and the PWM signal may have the same peak voltage in some embodiments, and thus the sampling activation signal may not affect the mixer output during times in which the PWM signal is high. Note that in other embodiments, the sampling activation signal and the PWM signal may not have the same peak voltage. For example, in one embodiment, the sampling activation signal may have a lower peak voltage than the PWM signal in order to reduce unnecessary fan movement and/or to reduce acoustic noise and/or power consumption caused by the inclusion of the sampling activation signal in the modified PWM signal.

Figure 2A:
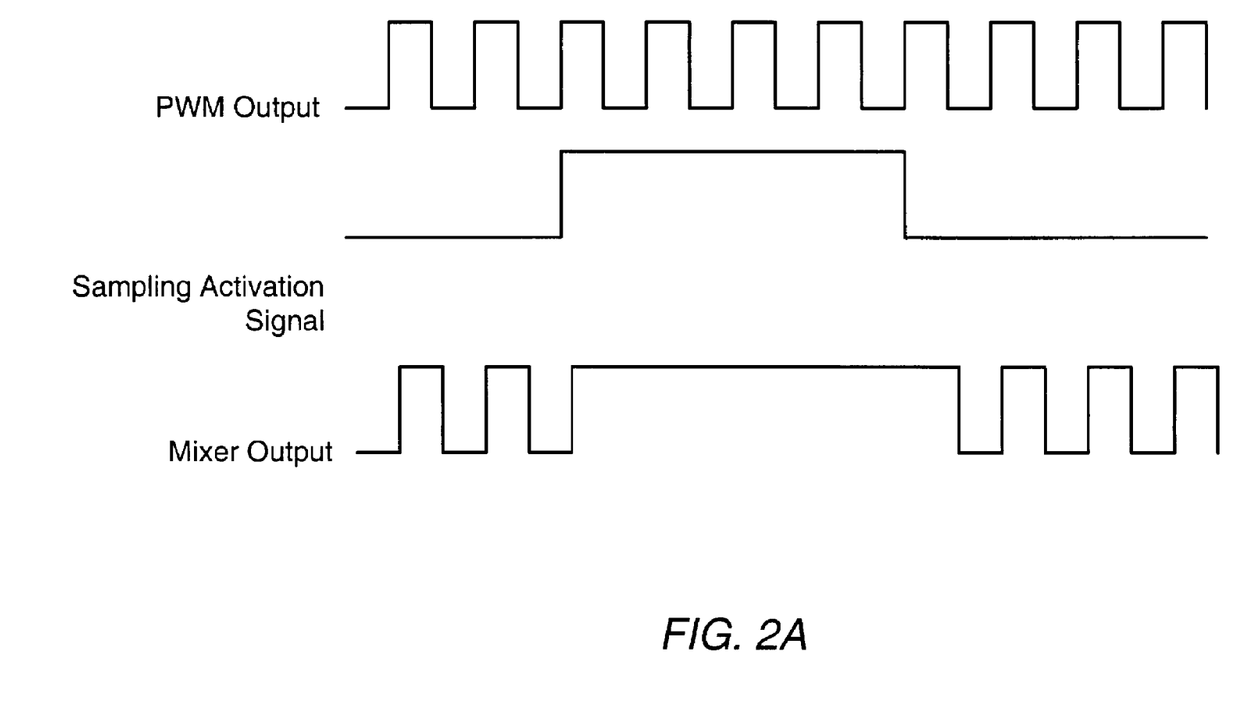
FIG. 2A shows exemplary signals that may be generated in another embodiment of a system to detect the speed of a fan.

In alternative embodiments, sampling activation signals having frequencies lower than the PWM signal may be generated and included in the PWM signal. FIG. 2A shows exemplary signals that may be generated in one such embodiment. In this embodiment, when the sampling activation signal is driven and the fan's tachometer sensor circuitry is powered on, the fan tachometer signal may provide a reliable indicator of the fan's speed.

Returning to FIG. 2, note that the sampling activation signal may affect the duty cycle of the mixer output signal (relative to the duty cycle of the PWM signal). Over each period of the PWM signal, the sampling activation signal may increase the effective duty cycle of the signal output by the mixer. This may increase the speed of the fan. In some embodiments, the fan control unit 213 may be calibrated to take this duty cycle offset into account. For example, the fan control unit 213 may cause the PWM to generate a signal with a slightly lower duty cycle than it would otherwise generate in order to cause the fan to operate at a particular speed. As the duty cycle of the PWM increases, the contribution of the sampling activation signal to the duty cycle of the mixed signal may decrease.

The sampling activation signal's duty cycle may be selected so that the sampling activation signal has little effect, if any, on the operation of the fan. For example, in one embodiment, a sampling activation signal duty cycle may be selected so that in the absence of a fan-powering PWM signal, the sampling activation signal itself could not cause the fan to start from a total stop. However, selection of the sampling activation signal duty cycle may also involve selecting a sampling activation signal pulse width that powers the fan for long enough to generate a valid tachometer signal.

Figure 3:
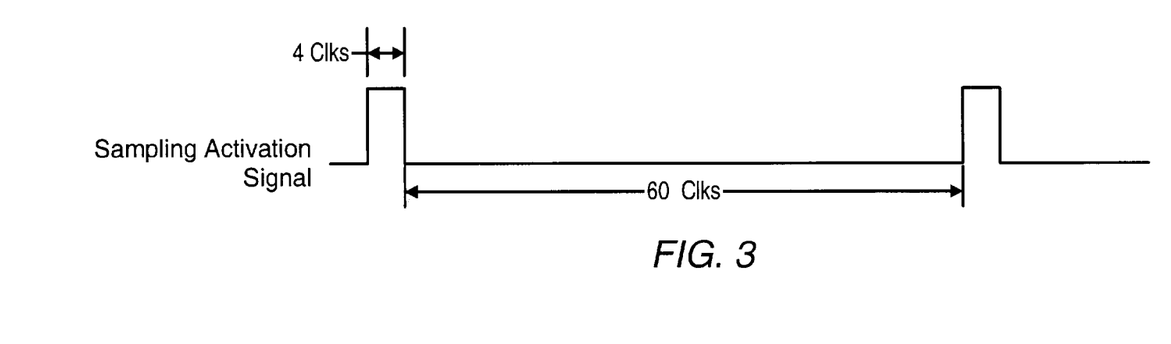
FIG. 3 shows an exemplary sampling activation signal that may be generated in one embodiment of a system to detect the speed of a fan.

FIG. 3 shows an exemplary sampling activation signal that may be generated in one embodiment. In this example, the sampling activation signal is a 1/16th duty cycle signal. The sampling activation signal is asserted for four clock cycles each sampling activation signal clock period and deasserted for 60 clock cycles each sampling activation signal clock period. In some embodiments, the sampling activation signal may be generated from a 90 KHz clock signal. If such a sampling activation signal is mixed with a PWM signal that is not being driven (e.g., the duty cycle of the PWM signal=0), the sampling activation signal may add a 6.25% duty cycle offset. If such a sampling activation signal is mixed with a 50% duty cycle PWM signal, half of the sampling activation signal pulses may occur during pulses in the PWM signal. Accordingly, the sampling activation signal may only add a 3.125% duty cycle offset in that situation. In such a situation, the fan control circuit 213 may be configured to control the PWM to output a signal having 3.125% less of a duty cycle than it would otherwise provide if no sampling activation signal was being mixed in with the PWM signal.

Figure 4:
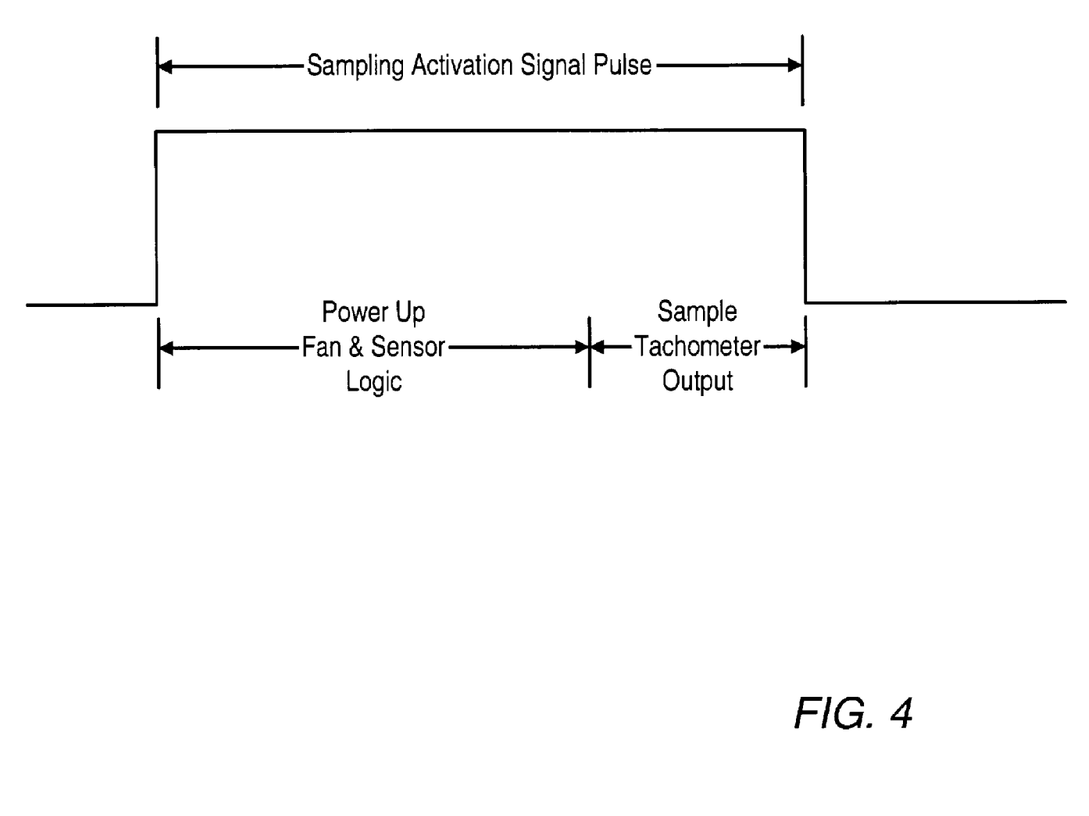
FIG. 4 illustrates an exemplary sampling activation signal pulse that may be generated in one embodiment of a system to detect the speed of a fan.

FIG. 4 shows an exemplary pulse in a sampling activation signal that may be generated in one embodiment. Different time periods within the sampling activation signal pulse are labeled to indicate what actions may be performed during those time periods. During a first time period within the sampling activation signal pulse, the fan and associated tachometer sensor logic within the fan may be powered on. Accordingly, the tachometer signal may not be valid during this portion of the sampling activation signal pulse. During a second time period within the sampling activation signal pulse, a valid tachometer signal may be output by the powered-on tachometer sensor circuitry within the fan. The tachometer signal may be sampled during this portion of the sampling activation signal pulse. The sampling activation signal generator may be configured to generate sampling activation signal pulses that are long enough to power up the fan's tachometer sensor circuitry and to allow time to sample the tachometer signal once it is generated. However, the length of the sampling activation signal pulse may be limited so that the sampling activation signal pulse is not much longer than is needed to perform these functions. The desired length of sampling activation signal pulse may vary depending on the time taken for a fan whose speed is being measured to be powered on.

A sample and hold circuit (such as sample and hold circuit 207 in FIG. 1) may be configured to sample the tachometer signal during the second time period within the sampling activation signal pulse. If, for example, the sampling activation signal pulse width is four clock cycles, the sample and hold circuit may be configured to sample the tachometer signal in the fourth clock cycle of each sampling activation signal pulse.

Figure 5:
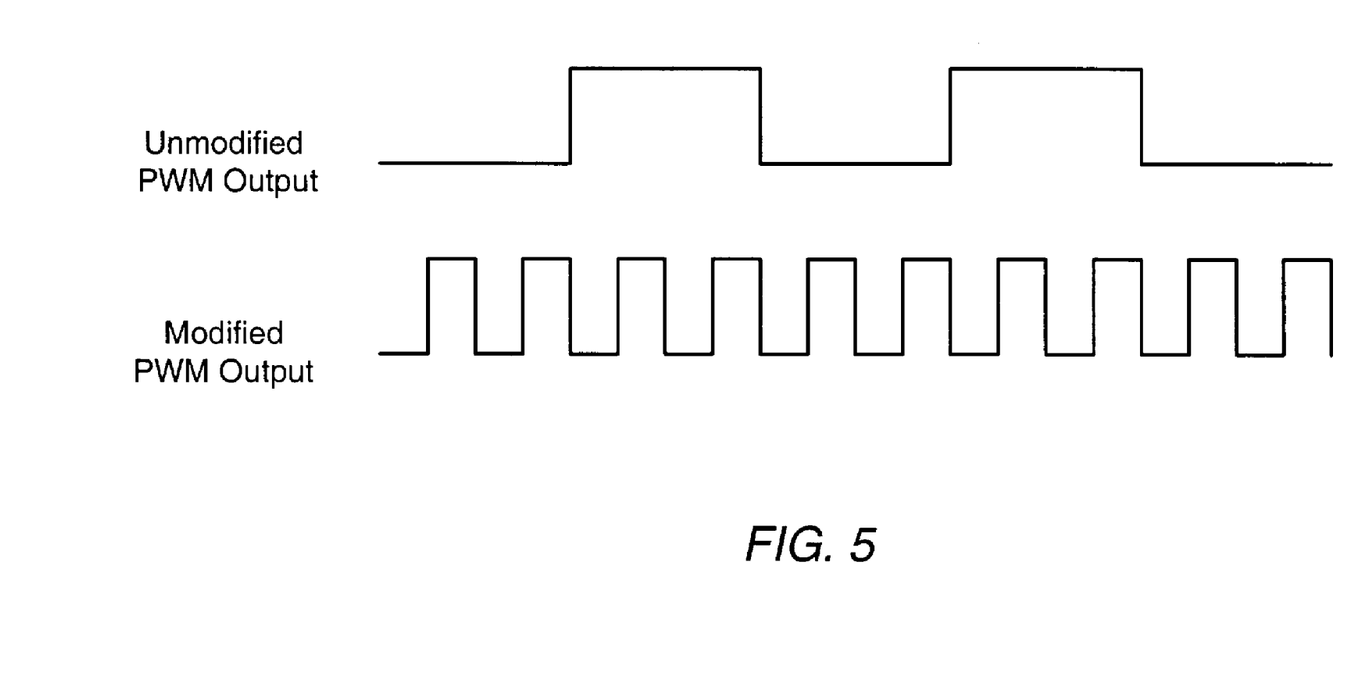
FIG. 5 shows exemplary signals that may be generated in an embodiment of a system for detecting the speed of a fan.

FIG. 5 shows timing diagrams of exemplary PWM signals that may be generated in an alternative embodiment of a system for detecting the speed of a fan. In this example, an unmodified PWM signal with a 50% duty cycle is shown. In some embodiments, the fan tachometer signal may not be adequately reconstructed during times at which the PWM signal is low. In order to allow the fan tachometer signal to be adequately reconstructed, the PWM signal may be modified to include a higher frequency sampling activation signal by modifying the frequency of the PWM signal itself. In this example, the PWM signal is modified to have a frequency that is four times the frequency of the unmodified PWM signal. The frequency of the modified signal may be selected so that the fan tachometer signal can be adequately reconstructed by sampling the fan tachometer signal during times at which the modified PWM signal is asserted. As mentioned above, the frequency of the modified PWM signal may be selected to be at least the Nyquist rate of the current fan tachometer signal in some embodiments. Again, note that PWM signals with duty cycles other than 50% may also be generated.

Figure 6:
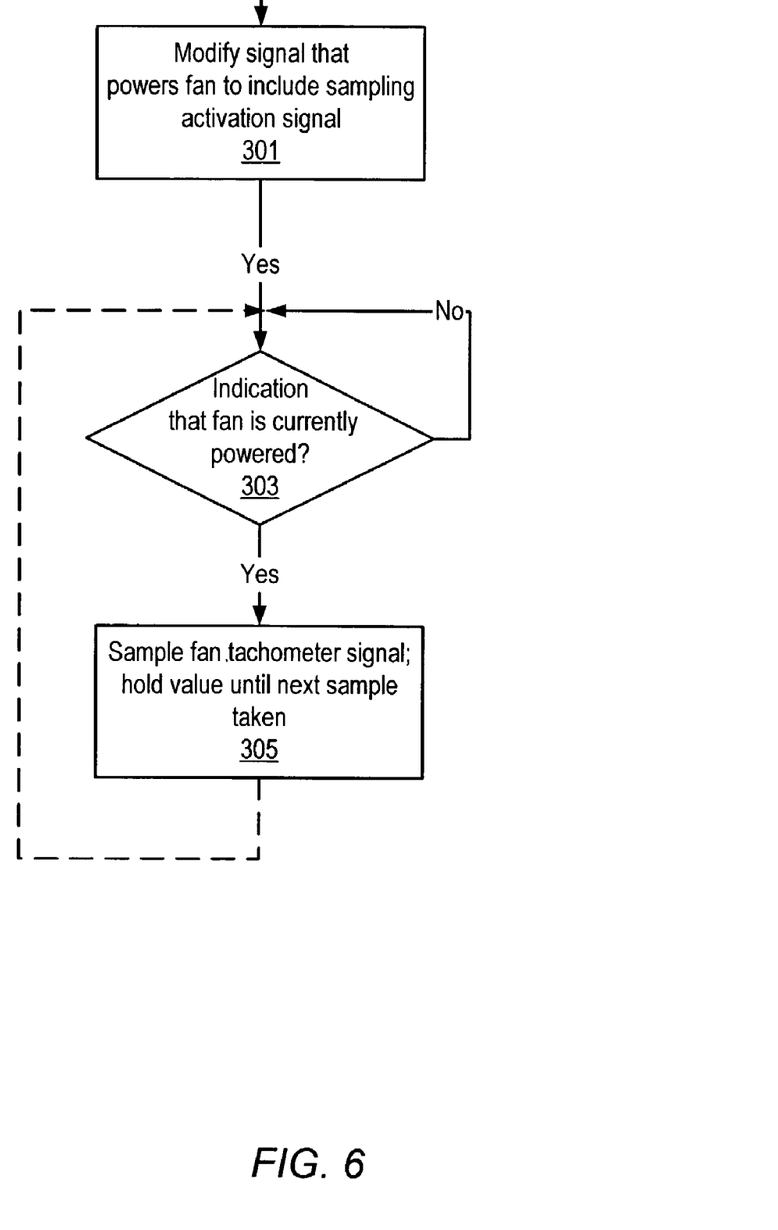
FIG. 6 is a flowchart illustrating one embodiment of a method of detecting the speed of a fan.

FIG. 6 shows one embodiment of a method of detecting the speed of a fan. At 301, the signal powering the fan is modified to include a sampling activation signal. Modifying the signal powering the fan may involve mixing a powering PWM signal with a higher frequency, lower duty cycle sampling activation signal in some embodiments. In other embodiments, the signal powering the fan may be modified by changing the frequency of the powering signal itself to a higher frequency. In still other embodiments, the signal powering the fan may be modified by mixing a powering PWM signal with a lower frequency, lower duty cycle sampling activation signal. This modified powering signal may then be used to power the fan.

As shown at 303–305, the fan tachometer signal may be sampled each time an indication is received that the fan is currently powered. These indications may be pulses in the modified powering signal or pulses in a sampling activation signal that has been mixed with the powering PWM signal. The sampled value of the signal may be held until the next sample is taken. The number of samples taken during each pulse may vary depending on the duration of each pulse. The sampling times may occur during a pulse a certain length of time after the pulse begins, allowing time for the fan tachometer circuitry to be powered up and begin generating a valid fan tachometer signal.

Numerous variations and modifications will become apparent to those skilled in the art once the above disclosure is fully appreciated. It is intended that the following claims be interpreted to embrace all such variations and modifications.

What is claimed is:

1. A system comprising:
    a PWM (Pulse Width Modulator) configured to generate a PWM signal;
    a signal modifier coupled to the PWM and configured to generate a modified PWM signal, wherein the modified PWM signal includes a sampling activation signal having a different frequency than the PWM signal;
    fan drive circuitry configured to receive the modified PWM signal and to provide power to a fan in response to the modified PWM signal; and
    a sampling unit configured to sample a fan tachometer signal in response to an indication that the fan is currently powered.

2. The system of claim 1, wherein the PWM, the signal modifier, and the sampling unit are included in an integrated circuit.

3. The system of claim 1, wherein the signal modifier includes a sample signal generator configured to generate the sampling activation signal.

4. The system of claim 3, wherein the sampling unit is configured to the sample signal generator, wherein the indication that the fan is currently powered is a pulse in the sampling activation signal.

5. The system of claim 4, wherein the sampling unit is configured to sample the fan tachometer signal one or more clock cycles after a rising edge in the sampling activation signal.

6. The system of claim 3, wherein the sampling activation signal has a higher frequency and a lower duty cycle than the PWM signal.

7. The system of claim 3, wherein the sampling activation signal has a lower frequency than the PWM signal.

8. The system of claim 3, wherein the signal modifier includes a mixer coupled to the PWM and the sample signal generator, wherein the mixer is configured to generate the modified PWM signal by mixing the PWM signal and the sampling activation signal signal, wherein the mixer is configured to output the modified PWM signal to the fan drive circuitry.

9. The system of claim 1, wherein the signal modifier includes a fan control unit configured to provide control signals to the PWM modifying a frequency of the PWM signal, wherein in response to the fan control unit modifying the frequency of the PWM signal, the PWM is configured to output the modified PWM signal.

10. The system of claim 9, wherein the modified PWM signal has a same duty cycle as the PWM signal.

11. The system of claim 9, wherein the modified PWM signal has a frequency equal to at least a Nyquist rate of the fan tachometer signal.

12. The system of claim 1, wherein the sampling unit is configured to hold a sampled value of the fan tachometer signal until a subsequent indication that the fan is currently powered is detected.

13. The system of claim 1, wherein the indication that the fan is currently powered is a pulse in the modified PWM signal.

14. The system of claim 1, wherein the fan drive circuitry includes a transistor configured to turn on in response to a pulse in the modified PWM signal, wherein when the transistor is turned on, the transistor electrically connects a ground interface of the fan to ground, wherein the transistor creates an open circuit between the ground interface of the fan and ground when the transistor is turned off.

15. The system of claim 1, wherein the fan drive circuitry includes a transistor configured to turn on in response to the modified PWM signal, wherein when the transistor is turned on, the transistor electrically connects a power interface of the fan to a power source, wherein the transistor creates an open circuit between the power interface of the fan and power source when the transistor is turned off.

16. The system of claim 14, wherein the modified PWM signal is an active-low signal.

17. The system of claim 1, wherein the PWM is configured to store a value indicating a length of each pulse in the PWM signal.

18. The system of claim 16, wherein the PWM is configured to modify the value indicating the length of each pulse in the PWM signal.

19. A method comprising:
generating a PWM signal;
modifying the PWM signal to create a modified PWM signal, wherein the modified PWM signal includes a sampling activation signal having a different frequency than the PWM signal;
powering a fan according to the modified PWM signal; and
sampling a fan tachometer signal in response to an indication that the fan is currently powered.

20. The method of claim 19, wherein said generating, said modifying, and said sampling are performed by an integrated circuit.

21. The method of claim 19, wherein said modifying includes mixing the PWM signal with the sampling activation signal.

22. The method of claim 21, wherein the sampling activation signal has a higher frequency and a lower duty cycle than the PWM signal.

23. The method of claim 21, wherein the sampling activation signal has a lower frequency and a lower duty cycle than the PWM signal.

24. The method of claim 19, wherein said modifying includes increasing a frequency of the PWM signal to equal a frequency of the sampling activation signal.

25. The method of claim 24, wherein the modified PWM signal has a frequency equal to at least a Nyquist rate of the fan tachometer signal.

26. The method of claim 24, wherein the modified PWM signal has a same duty cycle as the PWM signal.

27. The method of claim 19, wherein the indication that the fan is currently powered is a pulse in the sampling activation signal.

28. The method of claim 27, wherein said sampling comprises sampling the fan tachometer signal one or more clock cycles after a rising edge in the sampling activation signal.

29. The method of claim 19, wherein said sampling comprises holding a sampled value of the fan tachometer signal until a subsequent indication that the fan is currently powered is detected.

30. The method of claim 19, wherein the indication that the fan is currently powered is a pulse in the modified PWM signal.

31. A system comprising:
means for generating a power signal;
means for modifying the power signal to create a modified power signal, wherein the modified power signal includes a signal having a different frequency than the power signal;
means for conveying the modified power signal to a fan; and
means for sampling a fan tachometer signal in response to the signal having the different frequency.

* * * * *